June 25, 1935.  M. YAMAKI  2,006,038

VEHICLE TIRE

Filed June 8, 1934

Inventor
Masuji Yamaki
By E. F. Wenderoth
Attorney

Patented June 25, 1935

2,006,038

UNITED STATES PATENT OFFICE 2,006,038

VEHICLE TIRE

Masuji Yamaki, Sanno, Omori-ku, Tokyo-shi, Japan

Application June 8, 1934, Serial No. 729,716
In Japan June 6, 1933

1 Claim. (Cl. 152—14)

This invention relates to a vehicle tire of resilient material and more particularly a tire of the kind that prevents slipping or skidding.

A main object of this invention is to provide a vehicle tire which is non-skip or non-skid with a simple structure. Another object is to provide a tire which is virtually durable, keeping its useful life considerably longer than that of the ordinary tire of this kind. Still another object is to obtain the tire above described at a small cost.

Heretofore, hard material such as vulcanized rubber or the like has been fitted on or embedded in one way or other to prevent the tire from wearing-out and skidding all around the surface of said tire where it comes in contact with the ground, but it has been found that the elasticity of such material is more often different from that of the rubber which builds the foundation, and, the cohesion of the two materials being insufficient and imperfect, the said fitted or embedded rubber comes off easily.

In order to remove such a defect and to improve the manufacture I have embedded in the tire, just slightly underneath the tread surface that comes in contact with the ground, coils of some refractory metal wire such as steel wire (piano-wire) formed by winding it spirally. The said coils maintain sufficiently their resiliency or elasticity, cooperating with the resiliency of the rubber which forms the tire foundation to make an integrated resiliency. The tire constructed according to this invention is substantially in freedom from vibration and shock arised from uneven road since the aforesaid two elastic elements cooperate perfectly against them. The embedded coils constitute the tire form with the rubber and fully reenforce the strength of the tire thus formed. They are practically in pact with the tire body and do not readily come out even by use for a considerably long duration, substantially preventing the tire from wearing out and skidding.

It is apparent that the invention is good for all kinds of tires either pneumatic or solid. And the further advantages of the invention will be readily understood from the following description of a species thereof and from the accompanying drawing, in which:—

Figure 1:
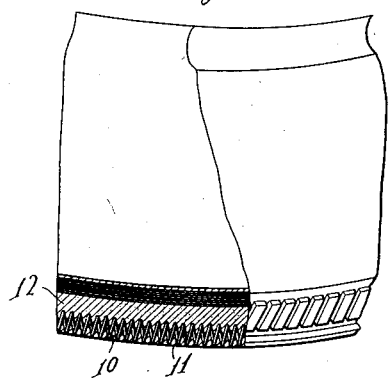
Figure 2:
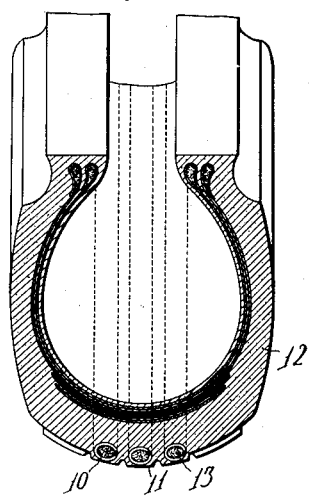
Figure 3:
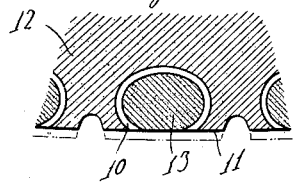

Figure 1 shows a part of the tire embodying this invention, seen from the side thereof with a part cut off, Figure 2 is a front view of the same with a cross-section, and Figure 3 is the like view enlarged at a tread part that comes in contact with the ground.

Although, for the sake of convenience, the illustration is given herein as to a pneumatic tire, the invention may be applicable to either pneumatic or solid tires as above mentioned.

In the drawing the coils 10 are made of metal wire of great hardness such as steel wire by winding it spirally. The coils are embedded in the rubber 12 which forms the tire. They are embedded in such manner that they are just slightly covered by the rubber or embedded slightly underneath the tread surface so as not to be exposed from the flat surface 11 or the narrow longitudinal ridges which are usually provided on the tread. In order that the resiliency of the tire is far increased it is preferable to embed such coils in the tread by laying them somewhat slantwise therein. By so embedding the coils a better consolidated resilient power is created in the tire.

The tire embodying this invention being thus formed, the tread surface or rather the ridge surface does not easily wear out because the refractory metal coils are sufficiently durable and prevent the ridges from wearing. Not only can the tire of this invention maintain its useful life for a considerable long duration but also prevent slipping or skidding. Even if a part of said coil be worn out, the metal wires embedded in the ridges keep sufficiently their integration and cohesion with the rubber foundation and do not come off, ever retaining their cooperating force and resiliency with the tire.

Furthermore, it is advantageous and effective when silica crystal grains 13 or the like solidified by the medium of a binder are desired to be embedded in the rubber body 12. In such a case it may be sufficient by filling such material into the core space of the coil 10 as is seen from Figures 2 and 3, without embedding it independently in the rubber body. It will never come off as it is firmly gripped by the wires which may still retain their individual arcuate form even when it is already in a state somewhat worn out, as it is shown in Figure 3.

While I have thus described my invention just referring to the specimen shown in the drawing it is to be understood that the material and manner hereinbefore mentioned are only examples and the invention is never limited thereto and various modifications and changes may be allowed without departing from the spirit of this invention.

What I claim is:—

A vehicle tire of resilient material comprising a plurality of coils of hard metal wire embedded along and underneath the tread surfaces or ridges thereof, the hollow space or core of each coil being filled with rough crystals of silica or similar material solidified by medium of binder to reenforce the strength of the coils and to stand against wearing of the tire.

MASUJI YAMAKI.